W. J. WEBBER.
Hay and Grain-Loaders.

No. 141,840.                               Patented August 12, 1873.

Witnesses
John L. Borne
Chas. M. Richardson

Winford J. Webber
per Dewey & Co.
Attys

UNITED STATES PATENT OFFICE.

WINFORD JAMES WEBBER, OF HOLLISTER, CALIFORNIA.

IMPROVEMENT IN HAY AND GRAIN LOADERS.

Specification forming part of Letters Patent No. 141,840, dated August 12, 1873; application filed March 29, 1873.

*To all whom it may concern:*

Be it known that I, WINFORD J. WEBBER, of Hollister, Monterey county, State of California, have invented a Hay and Grain Loader; and I do hereby declare the following description and accompanying drawings are sufficient to enable any person skilled in the art or science to which it most nearly appertains to make and use my said invention without further invention or experiment.

My invention relates to certain improvements in machines for loading hay or grain, or for sacks, barrels, or any class of merchandise, or for rocks; and it consists, mainly, in the employment of an adjustable derrick-post, which can be easily lengthened or shortened to suit the load as it is increased or diminished upon the wagon. This derrick is secured to the side of the wagon so as to be easily removable, and is provided with a wheel at the bottom, which runs on the ground and transmits power to a hoisting-pulley upon the same shaft. The upper end of the derrick is provided with a swinging arm, from the extremity of which the lifting fork or hooks depend, and a brake is suitably connected so as to hold the load at any desired point. The bearing-wheel can be elevated at pleasure, so as not to run upon the ground when not necessary.

Figure 1:
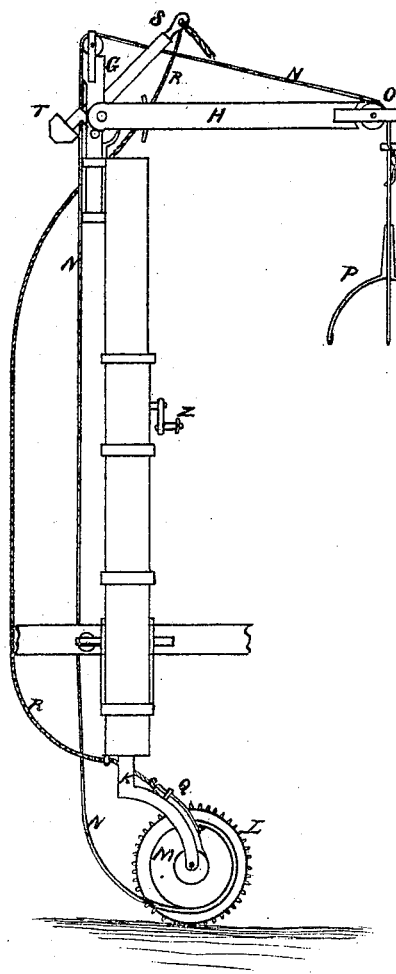
Figure 2:
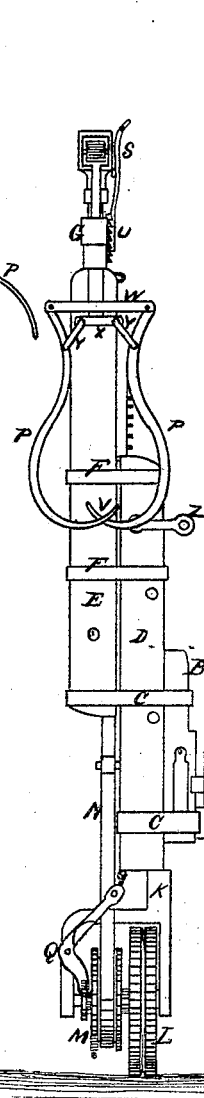
Figure 3:
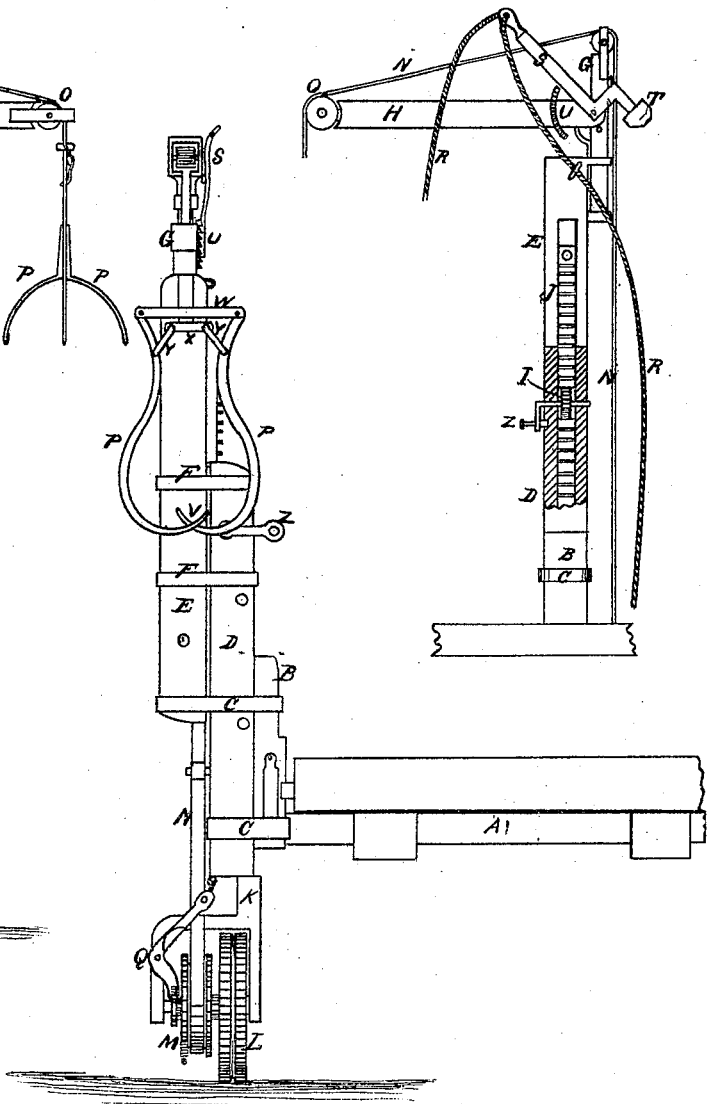

Referring to the accompanying drawings for a more complete explanation of my invention, Figure 1 is a side elevation of my loader. Fig. 2 is an end elevation. Fig. 3 is a back elevation.

A is a horizontal bar, which extends beneath the wagon and is secured by suitable straps or guides, so that it can be easily removed and, with its attachments, transferred to another wagon when the first one is loaded. Secured vertically at right angles to this bar is a short post, B, which has two stout straps, c c, passing around it, and forming guides through which the post D can slide. Another post, E, moves up and down, through the guides F, upon the post D. The vertical swiveling bar G is mounted upon the top of the post E and carries the arm H. The post D is grooved lengthwise in its outer face, and a shaft passes through the post, so that a pinion, I, upon this shaft will turn in the groove. The post E has a rack, J, fastened to its inner face, so that it will move up and down in the groove and be actuated by the pinion I, thus allowing the post to be lengthened or shortened to accommodate its height to the height of the load. At the bottom of the post D is a swiveling frame, K, which carries the wheel L. This wheel is made to rest upon the ground and drive the pulley M, which is upon the same shaft, and a rope, or preferably a strap, N, passes from the pulley up along the derrick-post and over a pulley at the top of the swiveling bar G. Thence it extends to the end of the arm H and over another pulley, O, and down to the fork or lifter P. The pulley M is provided with a clutch, and, by means of the lever Q, the pulley is thrown into gear or out of gear with the wheel L, as it may be desired to raise the load or to stop it. A cord, R, extends from the lever Q up along the derrick-post, and passes through the end of a lever, S, which is pivoted upon the side of the arm H. This lever is bent, as shown, and carries at its end a binding-block, T, between which and a similar block upon the post or bar G the strap N extends before it passes over the pulley O.

By means of the lever and block the strap can be firmly held by simply pulling upon the cord R, which draws the lever S down the rack U, holding it wherever it is desired. The same action of the cord will draw the lever Q and throw the pulley out of gear with the wheel L, thus stopping the load.

The operation of my machine will be as follows: The derrick, which is quite light, is secured to the side of a wagon, and, when not at work, will not cause any undue side weight; but when it is desired to work the wheel L is allowed to run upon the ground. This wheel thus supports the whole weight of the derrick and its load, whatever it may be. The pulley M being out of gear with the wheel, the fork P can be lowered so as to grasp the shock of grain, hay, or other load. The pulley is then thrown into gear by the action of a spring or by other means, when the force of traction of the wheel L will wind up the strap N, and thus lift the load. When the head of the fork strikes the end of the arm H it will lift it up, the arm being pivoted to the side of the swiveling bar G. The rope is then pulled, and this pulls down on the lever S and brings the block T against the strap N. At the same instant the rope also draws upon the lever Q and throws the pulley M out of gear with the wheel L, which leaves the weight of the load suspended from the end of the arm H. This draws the lever S and its block T, so that the latter is forced against the strap N and holds it securely, while the swiveling bar G with the arm H is turned so as to stand over the wagon or place of deposit. The lever S being then released from the rack U, the strap N will be released and the load will fall, when it can be detached from the fork P. As the load is made higher the post F is raised by means of a crank, Z, which operates upon the pinion I and rack J before described. If it be desired to elevate the wheel L from the ground, the post E is lowered until it rests upon the lower straps C, when another turn of the crank will elevate the post D and the wheel. The handles of the cranks can be pushed through and will serve as a holding-pin.

By this construction I am enabled to produce a loading device which is light, convenient, easily attached to any wagon, and which will produce no injurious side weight or draft, whatever may be the load. The loader can be left upon the wagon, when desired, by lowering the derrick-posts, so as to enter a barn-door.

Having thus described my invention, what I claim, and desire to secure by Letters Patent, is—

1. The posts D and E, with their guiding-straps C and F, and the rack and pinion J and I, constructed to elevate either post, substantially as and for the purpose herein described.

2. The traction-wheel L, with its pulley M, and the strap N, for the purpose of raising and lowering the fork P, and operating substantially as herein described.

3. The hinged arm H and the bent lever S, with its binding-block T and rack U, for holding the load suspended, substantially as herein described.

4. A loading device consisting of the sliding posts D and E, with the adjustable traction-wheel L and pulley M, strap N, fork P, and holding device T, constructed to operate substantially as and for the purpose herein described.

In witness whereof I hereunto set my hand and seal.

WINFORD JAMES WEBBER. [L. S.]

Witnesses:
 JOHN L. BOONE,
 C. M. RICHARDSON.